US009697636B2

(12) United States Patent
Flider (10) Patent No.: US 9,697,636 B2
(45) Date of Patent: Jul. 4, 2017

(54) APPLYING MOTION BLUR TO ANIMATED OBJECTS WITHIN A PRESENTATION SYSTEM

(71) Applicant: APPLE INC., Cupertino, CA (US)

(72) Inventor: Mark J. Flider, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 14/057,655

(22) Filed: Oct. 18, 2013

(65) Prior Publication Data

US 2015/0113371 A1    Apr. 23, 2015

(51) Int. Cl.
| | |
|---|---|
| *H04N 19/00* | (2014.01) |
| *H04N 21/00* | (2011.01) |
| *H04N 21/472* | (2011.01) |
| *G06T 13/80* | (2011.01) |
| *G06F 17/30* | (2006.01) |
| *G06F 17/21* | (2006.01) |

(52) U.S. Cl.
CPC ............ *G06T 13/80* (2013.01); *G06F 17/211* (2013.01); *G06F 17/30017* (2013.01); *G06F 17/30849* (2013.01); *G06F 17/30056* (2013.01); *G06F 17/30058* (2013.01); *G06F 17/30852* (2013.01); *G06F 17/30855* (2013.01)

(58) Field of Classification Search
CPC ... G06F 17/211; G06F 17/3089; G06F 17/212
USPC .......................................................... 715/204
See application file for complete search history.

(56) References Cited

U.S. PATENT DOCUMENTS

| | | | |
|---|---|---|---|
| 5,706,417 A * | 1/1998 | Adelson ........................ 345/640 |
| 5,758,046 A * | 5/1998 | Rouet ..................... G06T 15/10 |
| | | | 345/419 |
| 6,211,882 B1 | 4/2001 | Pearce et al. |
| 6,417,853 B1 * | 7/2002 | Squires et al. ................ 345/473 |
| 6,559,849 B1 * | 5/2003 | Anderson et al. ............ 345/474 |
| 6,956,576 B1 * | 10/2005 | Deering et al. ............... 345/475 |
| 7,466,322 B1 | 12/2008 | Moreton et al. |
| 7,721,209 B2 * | 5/2010 | Tilton ........................... 715/732 |
| 8,217,949 B1 | 7/2012 | Carpenter et al. |
| 8,348,746 B2 | 1/2013 | Wilson et al. |
| 2005/0253853 A1 * | 11/2005 | Sayre et al. .................. 345/474 |
| 2005/0270294 A1 * | 12/2005 | Le Tuan ....................... 345/473 |
| 2007/0098290 A1 * | 5/2007 | Wells .................... G06T 7/0081 |
| | | | 382/254 |

(Continued)

OTHER PUBLICATIONS

Gribel et al.; "High-Quality Spatio-Temporal Rendering using Semi-Analytical Visibility;" ACM Transactions on Graphics, vol. 30, No. 4, Article 54; Jul. 2011; 11 pgs.

*Primary Examiner* — Cesar Paula
*Assistant Examiner* — Luu-Phuong Nguyen
(74) *Attorney, Agent, or Firm* — Fletcher Yoder PC (57) ABSTRACT

Disclosed embodiments provide techniques for enhancing presentation system animations by applying motion blur to animated objects within a presentation system. Clipping the blur effect to particular regions may increase efficiencies over calculations of motion blur across an entire screen. Further, in certain embodiments, the motion blur may be calculated and presented on a per-object basis. Accordingly, relational objects (e.g., objects seemingly inside other objects and/or overlapping or crossing objects) may each have their own blur effect without impacting the other objects' blur effects.

20 Claims, 11 Drawing Sheets

(56) References Cited

U.S. PATENT DOCUMENTS

| | | | |
|---|---|---|---|
| 2008/0118175 A1* | 5/2008 | Rai | 382/264 |
| 2009/0085918 A1* | 4/2009 | Hollingworth | G06T 3/40 345/475 |
| 2010/0123908 A1* | 5/2010 | Denoue | G06F 17/212 358/1.6 |
| 2012/0177287 A1 | 7/2012 | Gribel et al. | |
| 2013/0188931 A1* | 7/2013 | Moguillansky | H04N 5/76 386/280 |

* cited by examiner

APPLYING MOTION BLUR TO ANIMATED OBJECTS WITHIN A PRESENTATION SYSTEM

BACKGROUND

The present disclosure relates generally to a presentation application. More specifically, this disclosure relates to motion blur features of object animations presented by the presentation application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, including for example computers, may be used to implement presentation applications. Using presentation applications, users may generate one or more slides that include different information, and may present the slides to an audience. By using a presentation application, the user may bring key points to the audience's attention and emphasize the focus of the presentation.

To further improve the quality of presentations, some presentation applications may include simple animations of objects as they enter a slide, exit a slide, or are moved within the slide. Unfortunately, the tradeoff between complex animations and presentation system performance oftentimes results in unrealistic or "jumpy" animations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Disclosed embodiments provide techniques for enhancing presentation system animations by applying motion blur to animated objects within a presentation system. In certain embodiments, because the movement of the object is known prior to presentation, the motion blur effect may be contained (e.g., clipped) to a particular region of the screen. This may result in increased efficiencies over calculations of motion blur across an entire screen. Further, in certain embodiments, the motion blur may be calculated and presented on a per-object basis. In other words, each presentation system object (e.g., a shape, background, and/or text) may be presented on a separate presentation layer (e.g., Z-order). Accordingly, relational objects (e.g., objects seemingly inside other objects and/or overlapping or crossing objects) may each have their own blur effect without impacting the other objects' blur effects.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment"

or "an embodiment" of the present disclosure are not intended to be interpreted as excluding the existence of additional embodiments that also incorporate the recited features. Further, the processes described herein may be understood to be performed by a computer processor that interprets machine-readable instructions, stored on a tangible, non-transitory, machine-readable medium.

Figure 1:
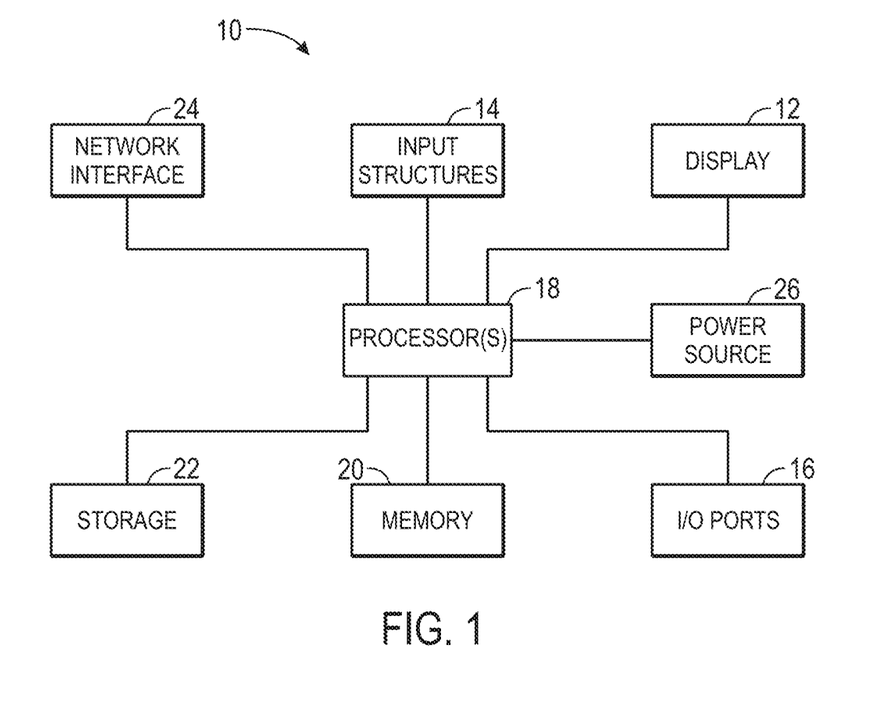
FIG. 1 is a block diagram of an electronic device that may use the techniques disclosed herein, in accordance with aspects of the present disclosure.
Figure 2:
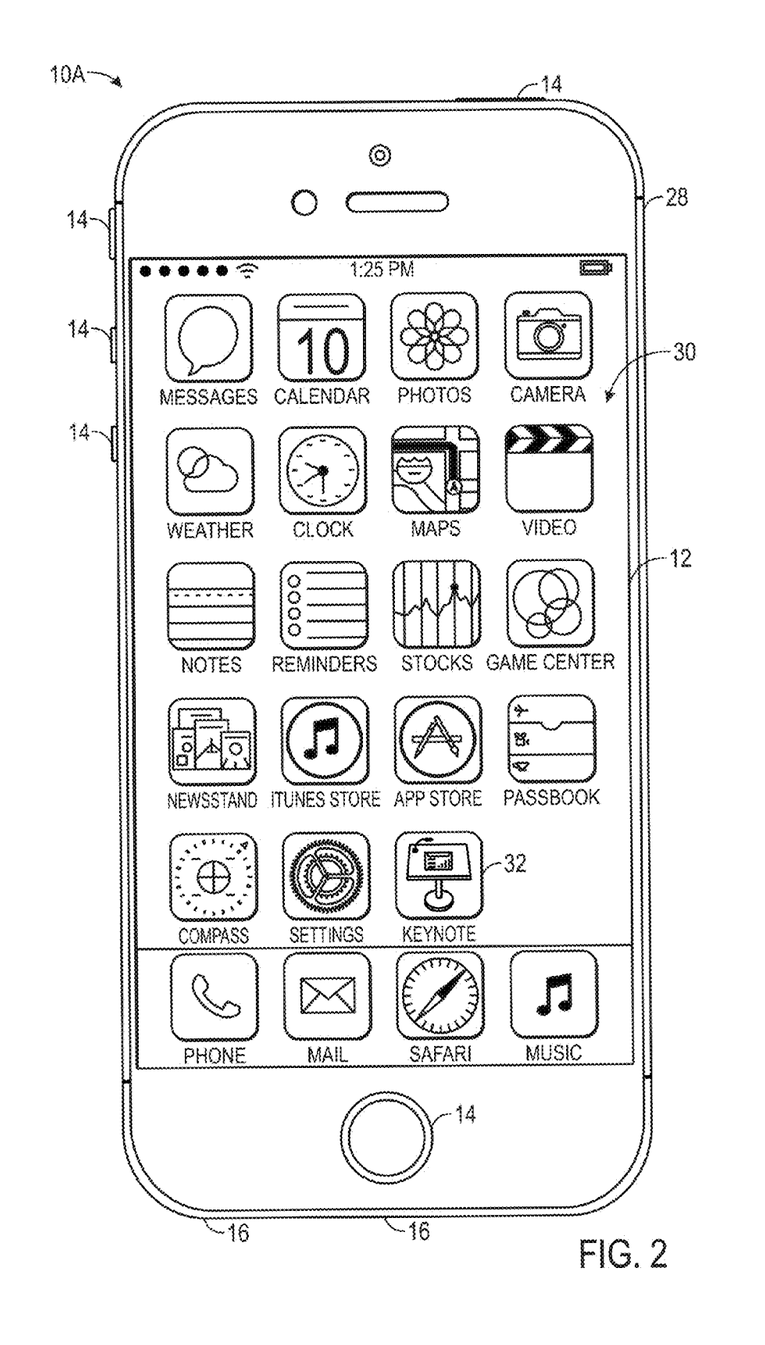
FIG. 2 is a front view of a handheld device, such as an iPhone® by Apple Inc., representing an example of the electronic device of FIG. 1.
Figure 3:
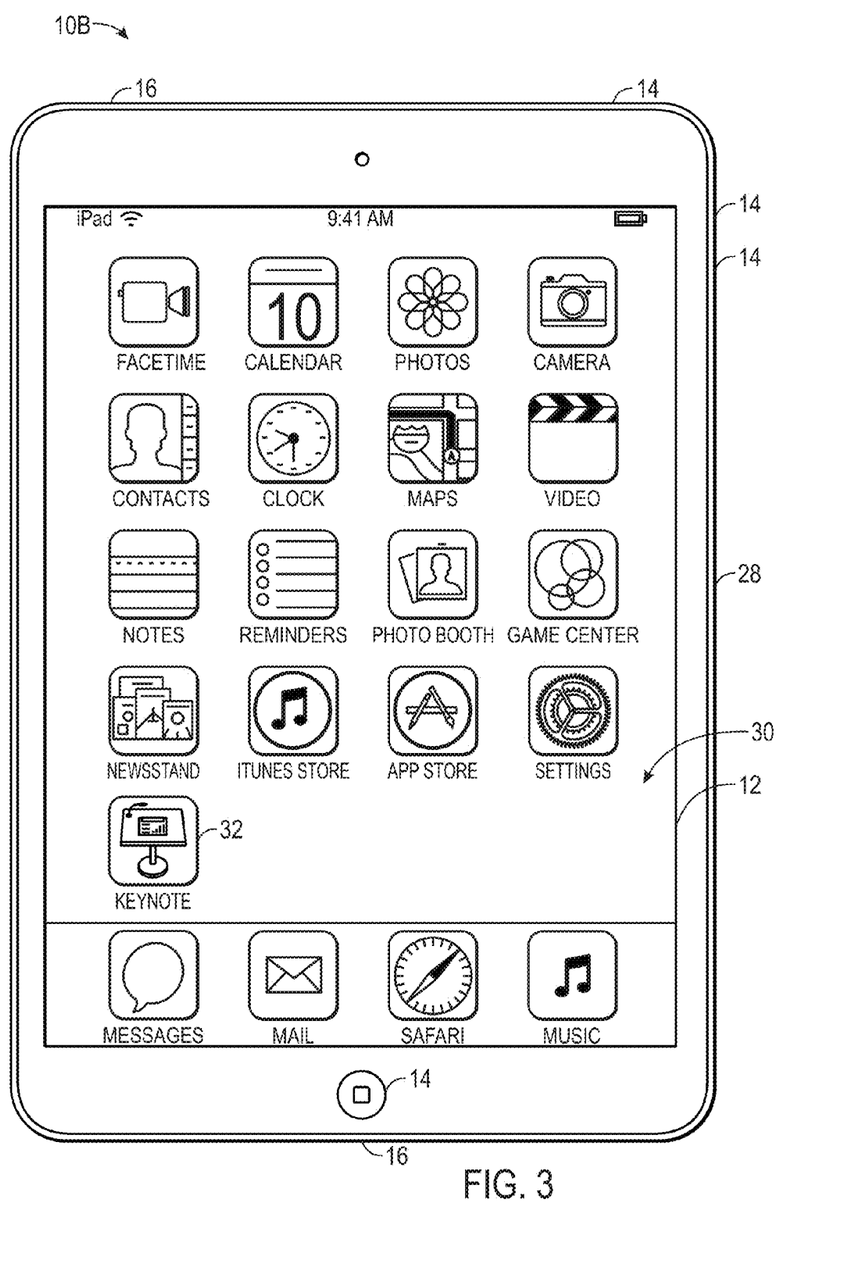
FIG. 3 is a front view of a tablet device, such as an iPad® by Apple Inc., representing an example of the electronic device of FIG. 1.
Figure 4:
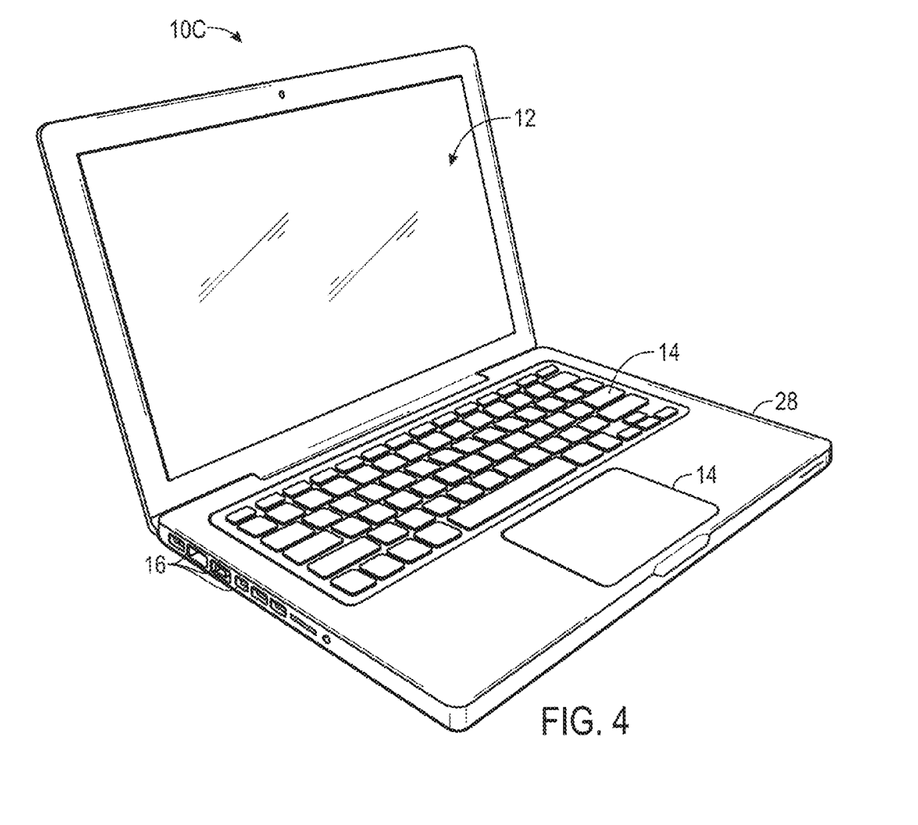
FIG. 4 is a perspective view of a notebook computer, such as a MacBook Pro® by Apple Inc., representing an example of the electronic device of FIG. 1.

A variety of suitable electronic devices may employ the techniques described below. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor (s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Keynote® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a presentation application program (e.g., Keynote® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the presentation application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Keynote® by Apple Inc.) running on the computer 10C.

Figure 5:
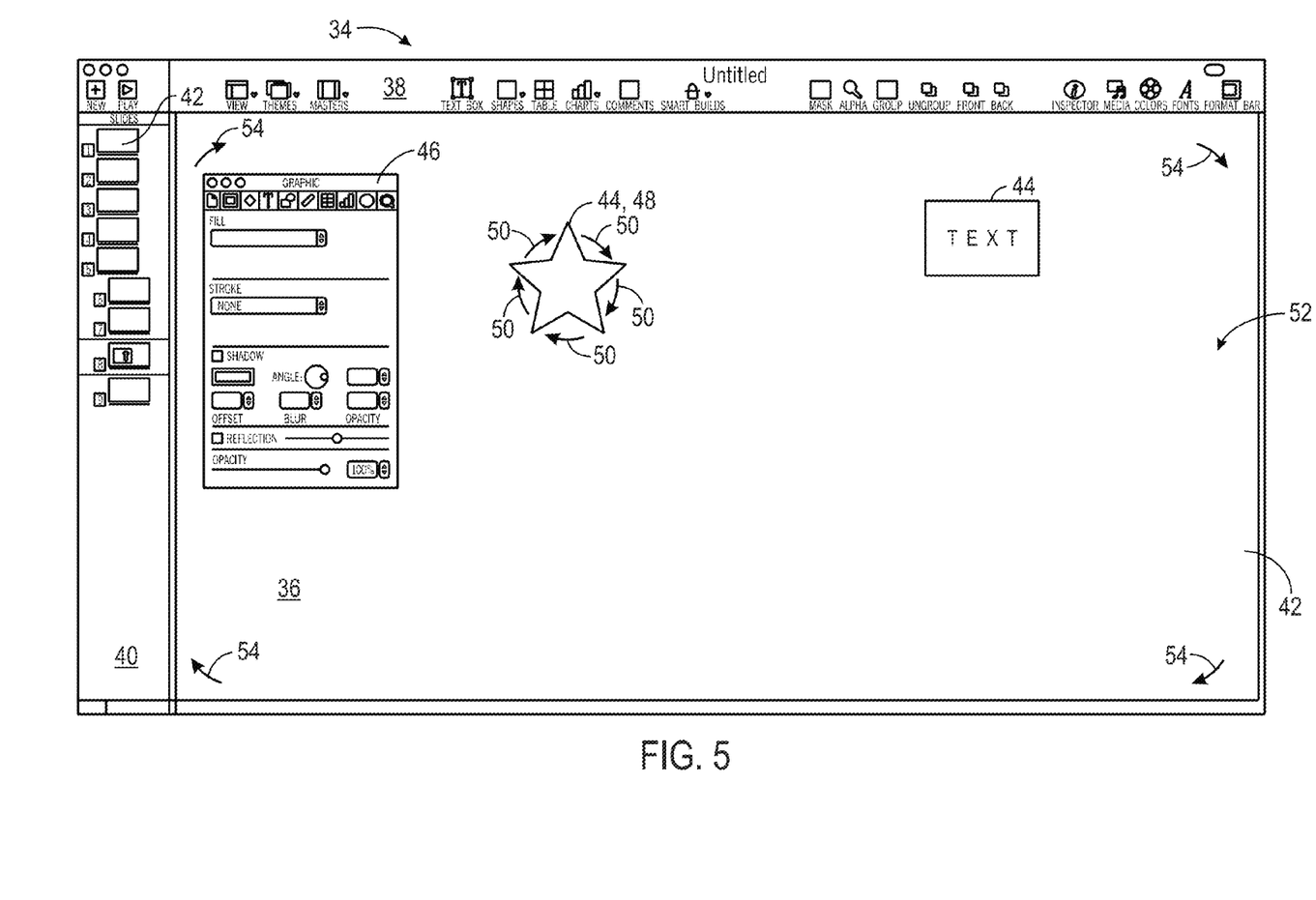
FIG. 5 illustrates a edit mode screen of a presentation application in accordance with aspects of the present disclosure.

With the foregoing in mind, a variety of computer program products, such as applications or operating systems, may use the techniques discussed below to enhance the user experience on the electronic device 10. For instance, the electronic device 10 may run a presentation program 34 (e.g., Keynote® from Apple Inc.) as shown in FIG. 5. The presentation application 34 shown in FIG. 5 may provide multiple modes of operation, such as an edit mode and a presentation mode. In FIG. 5, the presentation application 34 is shown in the edit mode. In the edit mode, the presentation application may provide a convenient and user-friendly interface for a user to add, edit, remove, or otherwise modify the slides of a slide show. To this end, the presentation program 34 may include three panes: a canvas 36, a toolbar 38, and a slide organizer 40. The canvas 36 may display a currently selected slide 42 from among the slide organizer 40. A user may add content to the canvas 36 using tool selections from the toolbar 38. Among other things, this content may include objects 44 such as text boxes, images, shapes, and/or video objects. When in the edit mode, the user may add or remove objects and/or may assign actions and/or effects to one or more of the objects. In the presentation mode, the user may display a created slide or a sequence of slides in a format suitable for audience viewing. In some embodiments, the presentation application may provide a full-screen presentation of the slides in the presentation mode, including any animations, transitions, or other properties defined for each object within the slides.

As used herein, the term "object" refers to any individually editable component on a canvas (e.g., the canvas 36 of the presentation application 34). That is, content that can be added to a slide and/or be altered or edited on the slide may constitute an object. For example, a graphic, such as an image, photo, line drawing, clip art, chart, or table that may be provided on a slide may constitute an object. In addition, a character or string of characters may constitute an object. Likewise, an embedded video clip may also constitute an object that is a component of a slide. Applying changes or alterations of an object, such as to change its location, size, orientation, appearance or to change its content, may be understood to be changing a property of the object. Therefore, in certain embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein. In certain graphics processing contexts, the term "object" may be used interchangeably with terms such as "bitmap" or "texture."

As used herein, a "slide" should be understood to refer to such a discrete unit of an ordered or sequential presentation. Such a slide, therefore, may be understood to function as a container for a set of objects (as discussed below) that together convey information about a concept. For example, a slide may contain or include different types of multimedia objects (e.g., text, numbers, images, videos, charts, graphs, and/or audio, and so forth) that explain or describe a concept to which the slide is directed and which may be handled or manipulated as a unit due to their being associated with or contained on the slide unit.

Further, because a slide may contain multiple objects, a slide may have an associated z-ordering of those objects as they are displayed on the slide. That is, to the extent that objects on the slide may overlap or interact with one another, they may be ordered or layered with respect to a viewer such that some objects are on top of or beneath other objects as they appear on the slide. In this way, a slide may not only have a width and length associated with it, but also a depth. The order or sequence of the slides in a presentation or slideshow is typically relevant in that the information on the slides (which may include both alphanumeric (text and numbers) and graphical components) is meant to be presented in order or sequence and may build upon itself, such that the information on later slides is understandable in the context of information provided on preceding slides. That is, there is a narrative or explanatory flow associated with the ordering or sequence of the slides. As a result, if presented out of order, the information on the slides may be unintelligible or may otherwise fail to properly convey the information contained in the presentation. This should be understood to be in contrast to more simplistic or earlier usages of the term "slide" and "slideshow" where what was typically shown was not a series of multimedia slides containing sequentially ordered content, but projected photos or images which could typically be displayed in any order without loss of information or content.

As mentioned above, the depicted example screen shown in FIG. 5 includes three panes: a slide canvas 36, a toolbar 38, and a slide organizer 40 for creating and editing various aspects of a slide of a presentation. With these panes, a user may select a slide of a presentation, add and/or edit the contents of a slide, and animate or add effects related to the contents of a slide. It should be understood that the size of each pane is merely illustrative, and that the relative size of each pane may vary or be adjusted by a user.

The slide organizer 40 may display a representation of each slide of a presentation that is being generated or edited. The slide representations may take on a variety of forms, such as an outline of the text in the slide or a thumbnail image of the slide. The slide organizer 40 may allow the user to organize the slides prepared using the application. For example, the user may determine or manipulate the order in which the slides are presented by dragging a slide representation from one relative position to another. As illustrated in FIG. 5, the slide representations in the slide organizer 40 may be indented or otherwise visually set apart for further organizational clarity.

Selecting a slide representation in the slide organizer 40 may result in the presentation application displaying the corresponding slide (e.g., slide 42) on the canvas 36. The selected slide 42 may include one or more suitable objects 44 such as, for example, text, images, graphics, video, or any other suitable object. A user may add or edit features or properties of the selected slide 42 when displayed on the slide canvas 36. For example, a user may edit settings or properties associated with the selected slide 42 (e.g., the slide background or template) on the canvas 36 or may edit the location, orientation, size, properties, and/or animation of objects (e.g., object 44) in the selected slide. The user may select a different slide to be displayed for editing on slide canvas 36 by selecting a different slide representation from the slide organizer 40.

In the depicted implementation, a user may customize objects 44 associated with the slide 42 or the properties of the slide 42 using various tools provided by the presentation application 34 in association with the canvas 36. For example, the toolbar 38 may provide various icons that activate respective tools and/or functions that may be used in creating or editing the slide 42. For example, the toolbar 38 may include an icon that, when selected, activates a build tool that allows one or more objects (e.g., images, tables, videos, etc.) to be selected and/or grouped Animations (motion, rotation, changes in size, shading, color, opacity, and so forth) may be generated for such selected objects or groups of objects. In some embodiments, the animations may be rendered in real-time (e.g., using dedicated graphics circuitry, such as a GPU on a video card) when slides containing the animations are displayed or presented as part of a presentation.

In some embodiments, the presentation application 34 may allow a control window 46 to be opened or displayed. The presentation application 34 may display the control window 46 automatically (e.g., based on the presentation application context) or in response to a user instruction (e.g., in response to a user instruction to display options related to one or more selected objects). The control window 46 may be moved, resized, and/or minimized/maximized independently of the panes 36, 38, and 40 (e.g., as an overlaid window). The control window 46 may provide one or more user input mechanisms of any suitable type, such as drop down menus, radio buttons, sliders, and so forth. The options available from control window 46 may vary based on a tool selected in toolbar 38 or by a type of object(s) 44 selected on the slide 42. For example, the control window 46 may provide different respective options if a table, video, graphic, or text is selected on the slide 42 or if no object 44 is selected. It should be understood that although only one control window 46 is shown in FIG. 5, the presentation application 34 may include any suitable number of control window 46.

In some embodiments, a user may animate, transform, or otherwise apply an effect to one or more objects 44 in a slide of a presentation, such as to generate a new slide or a build, e.g., an animation step, within an existing slide. A slide may contain various textual or graphical elements that may be introduced or animated in incremental or step-wise builds. For example, a slide may list a number of textual elements provided as bullet points, but each bullet point may be introduced as a different build of the slide, so that a time interval or user input causes an animation which results in the next build of the slide being displayed. In this way, the slide may be constructed so that it initially appears with a title but no bullet points, then a series of builds each result in the introduction and display of another bullet point on the slide until the steps are complete and the next slide is displayed. Similarly, a slide may include discrete builds in which one or more graphical or textual elements are animated (moved, rotated, scaled, faded in, faded out, and so forth) at each build. Thus, as used herein, it should be understood that the term slide should be understood as encompassing a slide and any or all of the build permutations of that slide, i.e., the slide after animation build 1, animation build 2, and so forth.

With this in mind and returning to the discussion of the edit mode of the presentation application, a user may invoke an action build mode via a respective icon on the toolbar 38. Such an action build mode may allow the user to assign one or more effects to an object or objects 44 displayed on the slide when the slide is displayed during a presentation. For example, the user may assign a sequence of actions, i.e., an action build, to the objects 44 on the slide such that the actions are sequentially implemented to the object 44 via different steps or builds of the slide when the slide is displayed in a presentation. In this way a sequence of actions, such as motion, rotation, as well as changes to color opacity, size and so forth, may be applied to objects 44 on the slide when the slide is displayed in a presentation. For example, such a sequence of actions may be used to animate an object 44 on the slide.

In the example provided in FIG. 5, a clockwise rotation effect has been added to a star 48, as evidenced by rotation indication arrows 50, which may or may not be displayed in the canvas 36. Further, a rotation effect has been applied to a background object 52 of the current slide, as evidenced by rotation indication arrows 54.

In order to present a more realistic rotation animation to the star 48 and/or the background object 52, a motion blur effect may be applied on a per-object basis during the rotation effect. As mentioned above, the motion blur effect attempts to make animations smoother and more natural by blurring at least a portion of the animated object. To add the motion blur effect, the electronic device 10 may calculate a current position (e.g., location and/or orientation) along with a previous position (e.g. location and/or orientation) for each point (e.g., pixel) of each object. Based upon the current position and the previous position, a vector may be established for each point of each object based on its animation. Each vector (e.g., the direction and/or magnitude associated with the vector) may be used to determine an amount and direction of a blur added to each object. By adding motion blur to an object, animations of that object may appear more natural and smooth. Moreover, by providing motion blur to each object on a per-object basis (e.g., considering the motion of each point of each object) rather than to all of the motion objects together on a per-frame basis, each object may have a respectively appropriate motion blur applied to it. The human eye may find it more pleasing and more lifelike, for example, to see different levels of motion blur applied to a rapid object and a slow object than to see some average amount of motion blur applied to both objects. Under these conditions, the rapid object may be blurred more than the slow object. By calculating the vectors of each of the points (or some subset of the points or average points) of the objects, rather than merely calculating an average amount of motion of the frame, the individual objects on the slides of the slide presentation 34 may each have particular amounts of motion blur applied based on their respective motions.

Figure 6:
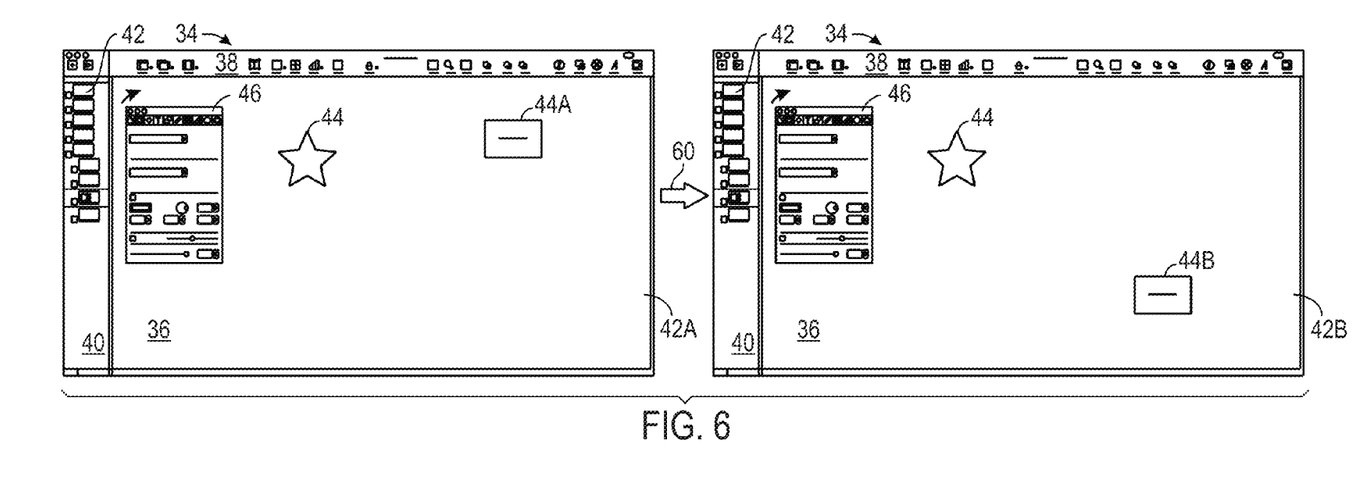
FIG. 6 illustrates slide to slide object associations, which may result in application of a motion blur effect, in accordance with an embodiment.

In addition to applying build actions, additional actions may be inserted into the presentation. For example, in some embodiments, the electronic device 10 may provide actions between slides. FIG. 6 illustrates slide to slide object associations, which may result in application of a motion blur effect, in accordance with an embodiment.

In the illustrated embodiment, the text box 44A of the selected slide 42A is associated with the text box 44B of selected slide 42B, as indicated by the association arrow 60. The objects 44A and 44B may be the same object moved into a different position, may be different objects in the same position, and/or may be different objects moved into a different position. Based upon the association of objects 44A and 44B, the presentation system may create a transition animation between slides 42A and 42B. For example, in the provided illustration, the text box 44A of slide 42A transitions to a lower position (e.g., the position defined by the placement of text box 44B in slide 42B). An animation representing this transition may be added between and/or on slides 42A and 42B. Additionally, a motion blur effect may be added to these animations, resulting in a more smooth and natural movement of the objects 44.

Figure 7:
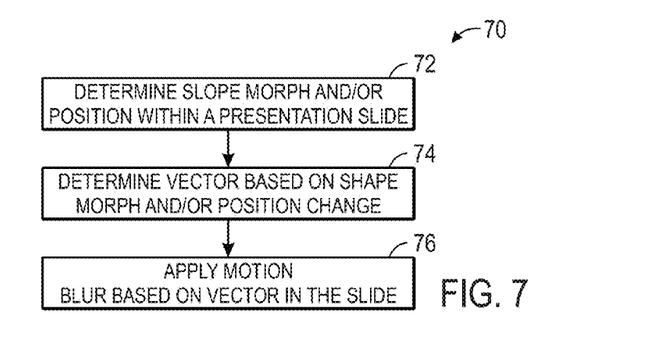
FIG. 7 is a flowchart, illustrating a process for applying a motion blur effect on objects within a presentation system, in accordance with an embodiment.

FIG. 7 is a flowchart, illustrating a process 70 for applying a motion blur effect on objects within a presentation system, in accordance with an embodiment. As mentioned above, specifics of the animation are detected. In some embodiments, these specifics may include determining a shape morph and/or position changes of an object within a presentation slide (block 72). Based upon the detected shape morph and/or position changes, one or more vectors may be determined for each point (e.g., pixel) of each object rather than merely calculating an average amount of motion of the frame (block 74). A vector, as used herein, is defined as a quantity with direction and magnitude. A motion blur for each point of each object may be applied to each object of the slide based upon the respective vectors associated with each object (block 76). Accordingly, animations of the objects within the slide may appear more fluid and natural.

In one embodiment, the process 70 may be implemented by the presentation system by use of special presentation objects implemented in the presentation system. For example, an object (e.g., a shape, background, bullet, etc.) may receive one or more parameters defining a previous position (e.g., location and/or orientation) and/or one or more previous shapes from which the object is to progress. This parameter may be used by a function of the object and/or the presentation system to determine the vector of the object's animation. The vector may then be used in a motion blur effect function of the object and/or presentation system.

Figure 8:
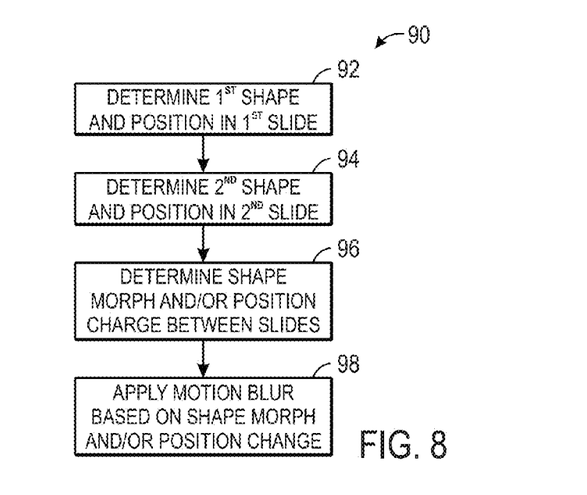
FIG. 8 is a flowchart, illustrating a process for applying a motion blur effect on slide to slide associated objects associated, in accordance with an embodiment.

FIG. 8 is a flowchart, illustrating a process 90 for applying a motion blur effect on slide to slide associated objects associated, in accordance with an embodiment. As previously discussed with regard to FIG. 6, objects of one slide may be associated with objects of previous or subsequent slides. To apply motion blur effects for these associated objects, a first shape and/or position (e.g., location and/or orientation) is determined (block 92). For example, as mentioned above, an object may be instantiated with a parameter defining a subsequent (e.g., the first) shape and/or position of the object. Further, a second shape and/or position (e.g., location and/or orientation) are determined (block 94). For example, this second shape and/or position may be the current shape and/or position of the object on the current slide. Based upon the first and second shapes and/or positions, a shape morph and/or position change between the first and second shapes and/or positions is determined (block 96). Based upon the determined shape morph and/or the position change, a motion blur effect may be applied between the slides (block 98). For example, the determined shape morph and/or position change may be used to determine one or more vectors that may be provided to a motion blur function of the object and/or presentation system. The motion blur function may determine a location and/or amount of blur to be added to the presentation animation based upon the vector.

Figure 9:
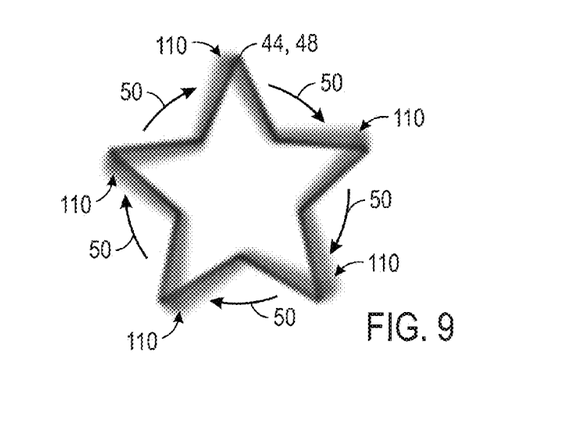
FIG. 9 illustrates motion blur of a rotating presentation system object, in accordance with an embodiment.
Figure 10:
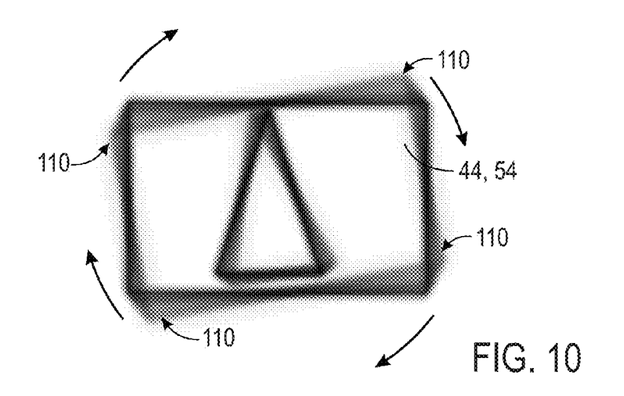
FIG. 10 illustrates motion blur of a rotating background object, in accordance with an embodiment.

For example, FIGS. 9 and 10 illustrate motion blur effects applied to rotating objects 44 of a presentation system. FIG. 9 illustrates motion blur applied to a rotating shape inserted to a presentation slide, in accordance with an embodiment. In the particular example provided in FIG. 9, a clockwise rotation effect has been added to the star 48, as evidenced by the rotation indication arrows 50. Further, FIG. 10 illustrates motion blur of the rotating background object 54, in accordance with an embodiment.

As mentioned above, a vector may be used to determine a motion blur effect 110. In the current example, because the one or more vectors would indicate a clockwise rotation of the star 48 and/or the background object 54, the motion blur direction and/or shape may be implemented accordingly. Further, the speed of the rotation may be indicated by the vector, also impacting the amount of blur that is applied to the presentation.

Figure 11:
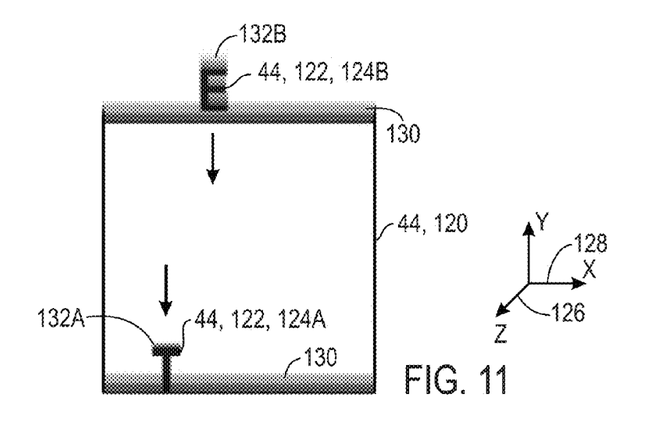
FIG. 11 illustrates an applied motion blur on a progression of differently layered animated objects, in accordance with an embodiment.

FIG. 11 illustrates an applied motion blur on a progression of differently layered animated objects, in accordance with an embodiment. In the provided example, motion blur effects are applied to multiple overlapping objects 44 in the presentation. Specifically, in the example of FIG. 11, objects 44 include a box object 120 and text string object 122 including individual character objects 124A and 124B. One or more of the objects 44 may include or may be associated with a parameter defining a z-order 126 different from the z-order of other objects 44 in the presentation. Additionally, some objects 44 may include or may be associated with a parameter defining a z-order 126 that is the same as other objects 44 of the presentation. For example, the text string object 122 may have a different z-order 126 than the box object 120, while the character object 124A may have the same z-order 126 as the character object 124B. In some embodiments, the z-order 126 of an object 44 may be changed. For example, in certain embodiment, the z-order of the string object 122 may be lower than the z-order 126 of the box object 120 as the objects are falling. As the string object 122 bounces up, the z-order of the string object 122 (or of the box object 120) may be changed, such that the string object 122 appears over the box object 120.

As mentioned above, the motion blur of an object 44 may be impacted by the vector associated with an animation of the object 44. For example, objects 44 that are perceived to be "heavier" (e.g., because of their size, makeup, etc.) may drop at a higher velocity than objects 44 that are perceived to be "lighter." This may result in varied motion blur effects for the various objects 44 in the presentation. By modifying the z-order of the objects 44, the motion blur of one object may have relatively little impact on an overlapping object and its motion blur. For example, assuming the box 120 is dropping (e.g., has a decreasing y-order 128), a motion blur 130 may be applied to the presentation. The character objects 124A and 124B may overlap portions of the box 120 and its motion blur 130. However, the presentation system may apply a higher z-order to the character objects 124A and/or 124B than the z-order of the box 120. This results in the character objects 124A and 124B and their associated motion blur effects 132A and 132B overlapping the box object 120 and motion blur 130 without any of the underlying box 120 or motion blur 130 being displayed behind the objects 124A and 124 B and/or the motion blur effects 132A and 132B. Accordingly, the motion blur 130 resulting from the animation of the box 120 does not impact the character objects 124A and 124B or their corresponding motion blur effects 132A and 132B.

Figure 12:
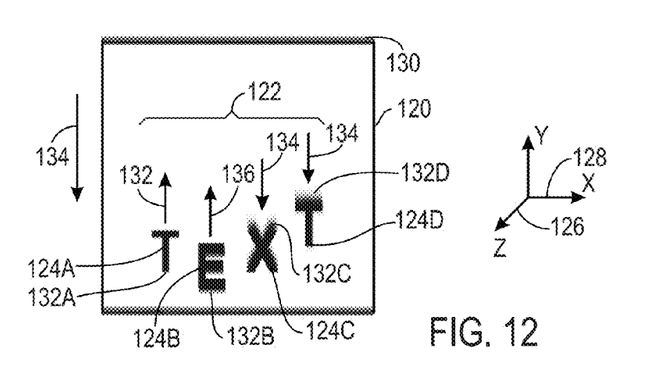
FIG. 12 illustrates a further progression of the objects of FIG. 11.

The vectors and motion blur effects may be calculated and presented at various frame rates within an animation presented in and/or between slides. For example, motion blur effects or vectors associated with motion blur effects may be calculated at each frame of an animation or may be calculated at a defined frame rate (e.g., once every 5 frames, etc.). FIG. 12 illustrates a further progression of the objects of FIG. 11, to illustrate varying vectors and accompanying motion blurs during the animation of an object 44. As illustrated, the string object 122 may be animated to fall 134 (decrease in y-order 128) and the bounce up 136 (e.g., increase in y-order 128) where it ends in a fixed position (e.g., as illustrated by character object 124A with little to no remaining motion blur 132A). As each of the character objects 124A, 124B, 124C, and 124D drop and bounce, their vectors and corresponding motion blur effects change. For example, because character object is in its final destination, its corresponding motion blur effect 132A is negligible. Character object 124A is bouncing up 136, creating an upward vector and a corresponding motion blur effect 132B. In contrast, character objects 124C and 124D are still both in downward animation (e.g., falling 134). Accordingly, their vector includes a downward y-order 128 direction, resulting in the corresponding blur effects 132C and 132D. By using differing z-orders among certain objects 44, motion blur effects may not impose on other objects 44 of the presentation. Accordingly, the motion blur 130 from the box 120 will not impose on the string object 122, because the string object 122 has a higher z-order than the box 120 and its blur effect, which has the same z-order magnitude as the object it results from (e.g., the box 120).

Figure 13:
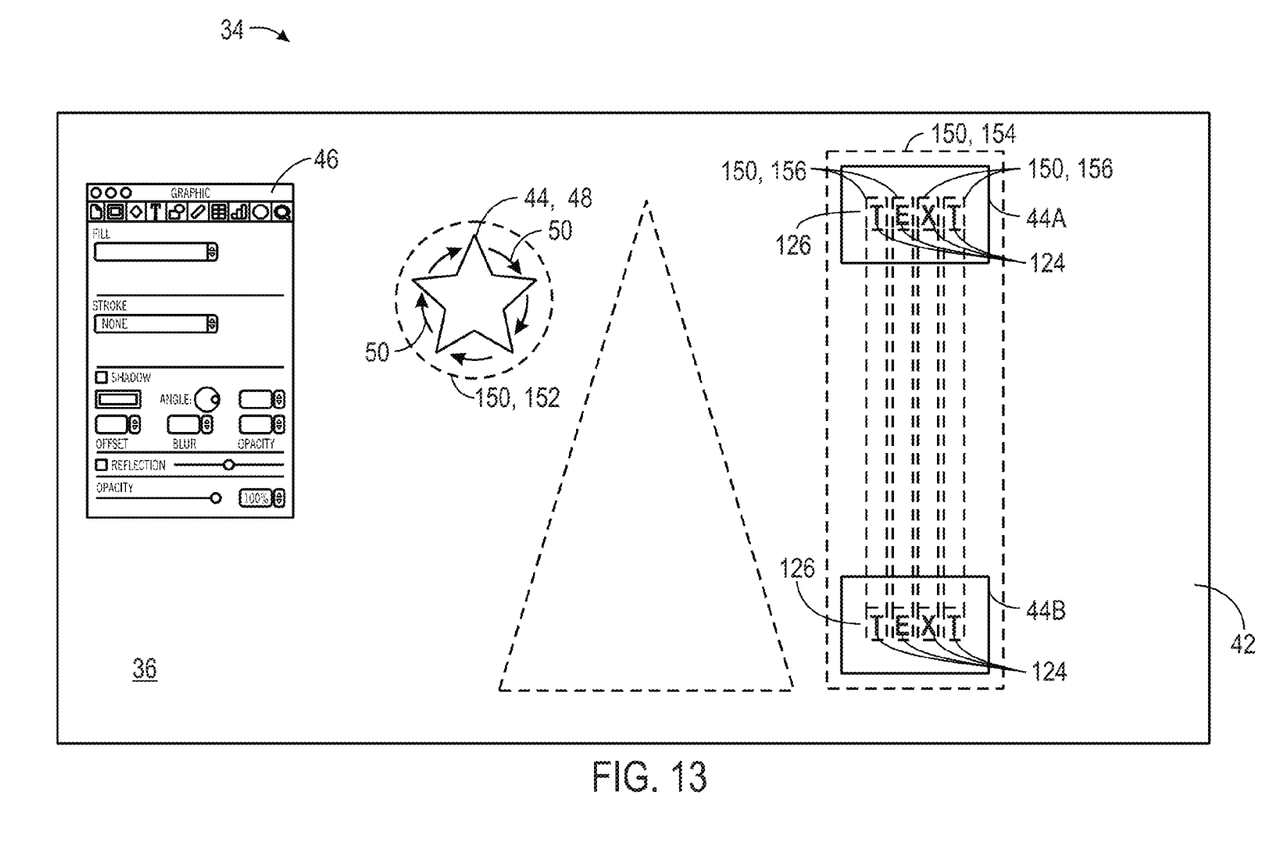
FIG. 13 illustrates motion blur regions for various animated presentation system objects, in accordance with an embodiment.
Figure 14:
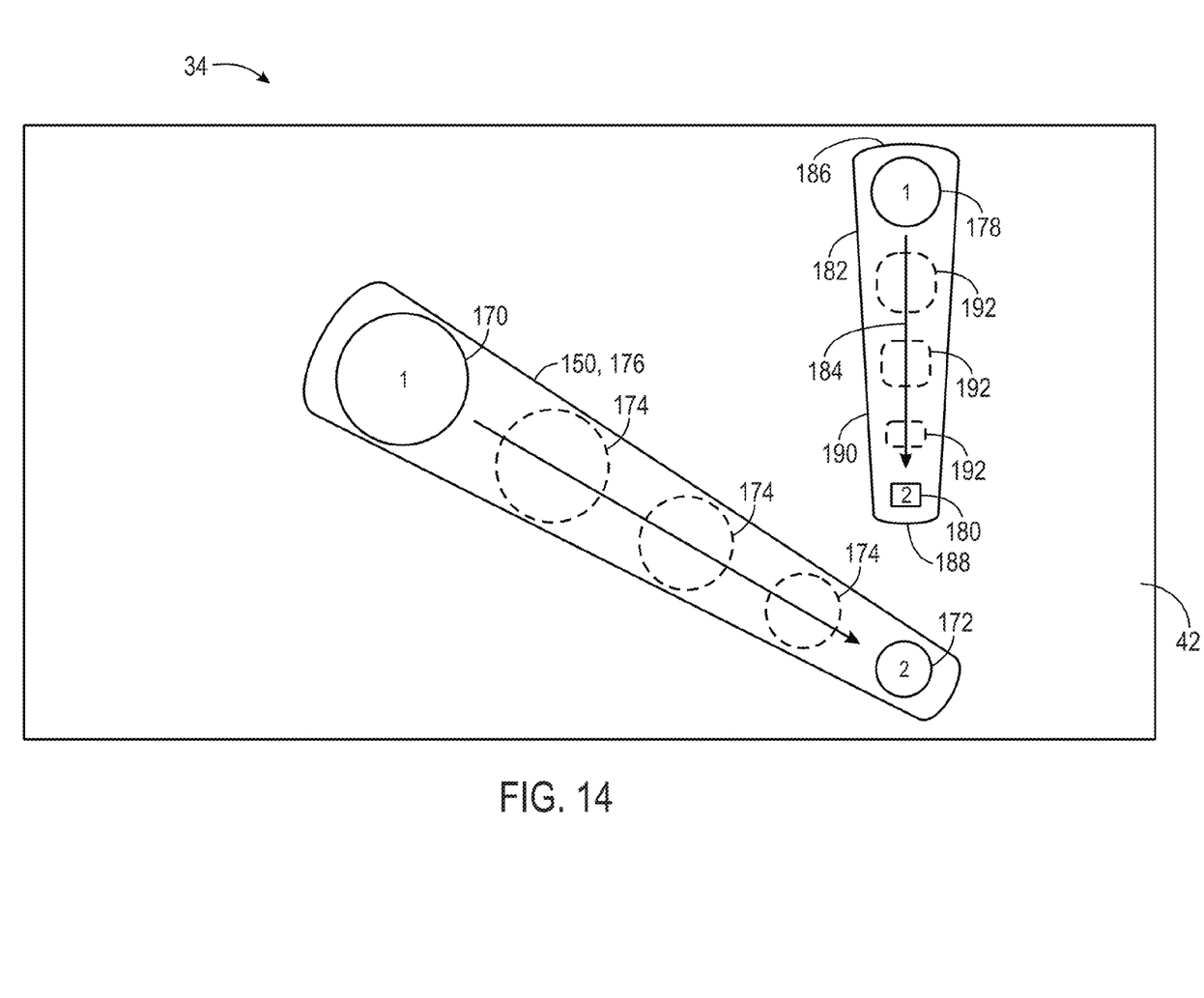
FIG. 14 illustrates additional motion blur regions for various animated presentation system objects, in accordance with an embodiment.

Having discussed the basics of applying a motion blur effect to objects 44 of a presentation, the discussion now turns to determining the motion blur effect in an efficient manner. Motion blur regions may define a clipping region where motion blur may be limited to, thus reducing calculations of the blur from a full frame calculation to one or more regional calculations, thus improving performance of the motion blur calculation. FIGS. 13 and 14 illustrate the presentation program 34 (e.g., Keynote® from Apple Inc.) where motion blur regions 150 have been defined for various animated presentation system objects 44, in accordance with an embodiment. As previously, mentioned, the objects 44 may be aware of first and second shapes and/or positions (e.g., locations and/or orientations) where the objects 44 may come from and go to, respectively. Using these first and second shapes and/or positions, the presentation system may discern regions 150 where motion blur may likely occur. For example, if the star 48 will rotate clockwise 50 while remaining at the same location, the blur region 150 of the star 48 (e.g., region 152) may immediately surround an area outside of the star 48. Further, a blur region (e.g., region 154) for slide to slide associated objects 44A and 44B, shown here on a single slide for simplicity. Additionally, individual blur regions 150 (e.g., regions 156) are determined for each of the character objects 124 of the string object 122. In contrast to the current example, in some embodiments where the character objects 124 move as a single string object 122, a blur region 156 may be determined for the whole string object 122 animation rather than regions 156 for each of the character objects 124.

The blur regions may be impacted not only by position (e.g., location and/or orientation changes) of an object 44, but also any shape morphing of the objects 44. FIG. 14 illustrates additional motion blur regions for various animated presentation system objects, in accordance with an embodiment, where shape morphing occurs. For example, a large circle object 170 may morph into a smaller circle object 172, as indicated by the "1" and "2" labels, respectively. The morph may occur in a single slide and/or may occur between slides via slide to slide associated objects. Because the morph results in a progressively smaller circle object (as indicated by the progression circles 174), the blurring region 150 of the circle morphing animation (e.g., region 176) may also progressively decrease, in accordance with the morphing and/or position progression.

The blur region 150 may also change shape based upon a shape morph. For example, circle object 178 may morph into a square object 180 (as indicated by labels "1" and "2", respectively). The blur region 150 may be defined according to the shape, as it exists, near the blurring region 150. Accordingly, in some embodiments, the blurring region 150 (e.g., region 182) may follow the shapes along the animation pathway 184. Accordingly, the top 186 of the region 182 may mimic (e.g., shape in correlation to) the top of circle object 178, while the bottom 188 of the region 182 may mimic the bottom of object 180. The sides 190 of the region 182 may mimic the sides of the object 178, 180, and progression objects 192 along the animation pathway 184. Accordingly, the blur regions 150 may closely match the animations presented in the presentation system 34. As will be discussed in more detail, with regard to FIG. 15, this may result in more efficient blurring than processes that calculate blurring across an entire frame.

Figure 15:
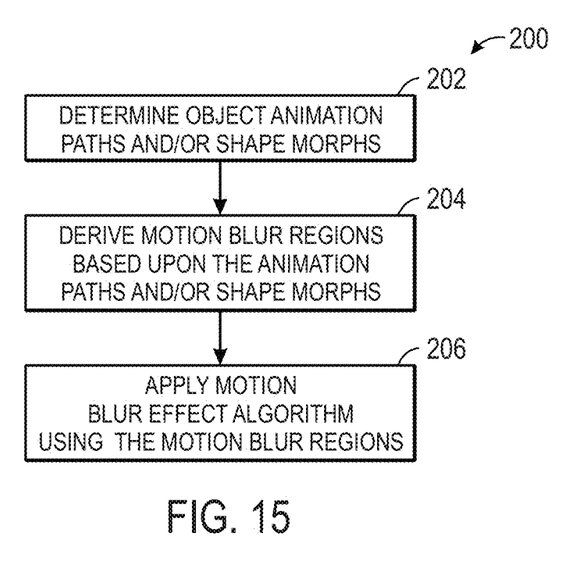
FIG. 15 is a flowchart, illustrating an enhanced process for applying motion blur using motion blur regions, in accordance with an embodiment.

FIG. 15 is a flowchart, illustrating an enhanced process 200 for applying motion blur using motion blur regions, in accordance with an embodiment. First, an animation path and/or shape morph of an object is determined (e.g., by comparing the first shape and/or position (e.g., location and/or orientation) with the second shape and/or position (e.g., location and/or orientation) (block 202). Next, based upon the animation paths and/or shape morphs a blur region is determined (block 204). The blur region may define where to apply motion blur effects. By defining particular blur regions, the blurring algorithms need not analyze or alter regions outside of the blur regions. This may result in significant processing savings, increasing presentation performance. Once the blur regions are defined, the motion blur effect algorithm may be applied to the motion blur regions, based upon the animation paths and/or shape morphs (block 206). As discussed above, this may be done using one or more vectors defining movement of all or portions of the animated objects. Because the blur algorithm is only applied to the blur regions, significant processing resources may be preserved.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for generating motion blur for one or more animated objects of a computer-implemented slide show presentation, comprising:
    generating an animation for one or more objects from a first slide to a second slide of a computer-implemented slide show presentation system, by:
    determining a first shape and a first position for each of the one or more objects in the first slide:
    determining a second shape and a second position for each of the one or more objects in the second slide; and
    determining a shape morph from the first shape to the second shape, a position change from the first position to the second position, or both for each of the one or more objects between the first slide and the second slide;
    calculating a respective motion blur effect for each of the one or more objects from the first slide to the second slide based upon the animation, by applying motion blur for each of the one or more objects based on the shape morph or the position change for each of the one or more objects; and
    presenting the animation and the respective motion blur effect in the computer-implemented slide show presentation system, wherein the respective motion blur effect is clipped to one or more motion blur regions.

2. The method of claim 1, comprising presenting the animation and the respective motion blur effect during a slide transition between the first slide and the second slide.

3. The method of claim 1, comprising determining one or more vectors of movement of the one or more objects, wherein the respective motion blur effect for each of the one or more objects is based upon the one or more vectors.

4. The method of claim 1, wherein each motion blur region of the one or more motion blur regions is determined by:
    determining an animation path of the one or more objects;
    determining an encompass region that encompasses the one or more objects along the animation path as well as an a region where blurring may occur; and
    setting the encompass region as the motion blur region.

5. The method of claim 1, wherein the motion blur region is determined by: determining an animation path of the one or more objects; and mimicking at least a portion of a shape of the one or more objects along the animation path a preset distance from the one or more objects.

6. The method of claim 1, comprising determining an object of the first slide associated with an object of the second slide as one or more of the one or more objects.

7. The method of claim 1, wherein one of the one or more objects comprises a background of the slide show presentation.

8. The method of claim 1, wherein the one or more objects comprise a string object comprising one or more character objects, wherein motion blur regions are determined for each of the one or more character objects.

9. The method of claim 1, wherein the one or more objects comprise a string object comprising a string of characters, wherein a motion blur region is determined for the entire string of characters.

10. A system for generating motion blur for one or more animated objects of a computer-implemented slide show presentation, comprising a computer processor configured to:
generate an animation for one or more objects from a first slide to a second slide of a computer-implemented slide show presentation system;
calculate a respective motion blur effect for each of the one or more objects from the first slide to the second slide based upon the animation, comprising instructions to:
determine a first shape and a first position for each of the one or more objects in the first slide;
determine a second shape and a second position for each of the one or more objects in the second slide;
determine a shape morph from the first shape to the second shape, or a position change from the first position to the second position, for each of the one or more objects between the first slide and the second slide; and
apply motion blur for each of the one or more objects based on the shape morph or the position change for each of the one or more objects; and
present the animation and the respective motion blur effect in the computer-implemented slide show presentation s stem wherein the respective motion blur effect is clipped to one or more motion blur regions.

11. The system of claim 10, wherein at least one of the one or more animated objects in a first subset comprises a string object comprising one or more character objects, wherein the character objects are each presented on a common animation layer (z-order).

12. The system of claim 10, comprising presenting the one or more animated objects and any corresponding motion blur effects with a higher order animation layer on top of any overlapping animated objects and any corresponding overlapping motion blur effects with a lower order animation layer, such that the overlapping animated objects and corresponding overlapping motion blur effects with a lower order animation layer do not impact the animated objects and any corresponding motion blur effects with a higher order animation layer.

13. The system of claim 10, wherein one or more of the animated objects is presented on an animation layer that changes, such that one or more of the animated objects varies between a higher animation layer and a lower animation layer than an overlapping animated object.

14. At least one tangible, non-transitory, machine-readable medium, comprising machine-readable instructions, that when executed by one or more computing devices, cause the one or more computing devices to:
generate an animation for one or more objects from a first slide to a second slide of a computer-implemented slide show presentation system;
calculate a respective motion blur effect for each of the one or more objects from the first slide to the second slide based upon the animation, comprising instructions to:
determine a first shape and a first position for each of the one or more objects in the first slide;
determine a second shape and a second position for each of the one or more objects in the second slide;
determine a shape morph from the first shape to the second shape, or a position change from the first position to the second position, for each of the one or more objects between the first slide and the second slide; and
apply motion blur for each of the one or more objects based on the shape morph or the position change for each of the one or more objects; and
present the animation and the respective motion blur effect in the computer-implemented slide show presentation system, wherein the respective motion blur effect is clipped to one or more motion blur regions.

15. The machine-readable medium of claim 14, comprising instructions to: calculate the one or more motion blur regions for the animation of the one or more objects; and calculate the respective motion blur effect in only the one or more motion blur regions.

16. The machine-readable medium of claim 15, comprising instructions to calculate the one or more motion blur regions by: interpolating intermediate shapes, intermediate positions, or both between the first shape, the first position, or both and the second shape, the second position, or both; and defining the one or more motion blur regions based upon: the first shape, the first position, or both; the intermediate shapes, the intermediate positions, or both; and the second shape, the second position, or both.

17. The machine-readable medium of claim 15, comprising instructions to calculate the respective motion blur effect by: interpolating intermediate shapes, intermediate positions, or both between the first shape, the first position, or both and the second shape, the second position, or both; determining a vector comprising a magnitude and direction based upon the first shape, the first position, or both compared with the intermediate shapes, the intermediate positions, or both; and defining the respective motion blur effect based upon the vector.

18. The machine-readable medium of claim 17, comprising instructions to determine the vector at every frame of an animation between the first shape, the first position, or both and the second shape, the second position, or both.

19. The machine-readable medium of claim 17, comprising instructions to determine the vector at a defined frame rate of an animation between the first shape, the first position, or both and the second shape, the second position, or both.

20. The machine-readable medium of claim 14, wherein the animation comprises an object morph of the one or more objects.

* * * * *

UNITED STATES PATENT AND TRADEMARK OFFICE
CERTIFICATE OF CORRECTION

PATENT NO. : 9,697,636 B2  
APPLICATION NO. : 14/057655  
DATED : July 4, 2017  
INVENTOR(S) : Mark J. Flider Page 1 of 1

It is certified that error appears in the above-identified patent and that said Letters Patent is hereby corrected as shown below:

In the Claims

Column 12, Line 30 Claim 1, replace "slide:" with --slide;--.

Column 13, Line 27 Claim 10, replace "slide:" with --slide;--.

Column 13, Line 40 Claim 10, replace "s stem" with --system--.

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*